US008055820B2

(12) United States Patent  
Sebire

(10) Patent No.: US 8,055,820 B2  
(45) Date of Patent: Nov. 8, 2011

(54) APPARATUS, SYSTEM, AND METHOD FOR DESIGNATING A BUFFER STATUS REPORTING FORMAT BASED ON DETECTED PRE-SELECTED BUFFER CONDITIONS

(75) Inventor: Benoist Sebire, Tokyo (JP)

(73) Assignee: Nokia Siemens Networks Oy, Espoo (FI)

( * ) Notice: Subject to any disclaimer, the term of this patent is extended or adjusted under 35 U.S.C. 154(b) by 208 days.

(21) Appl. No.: 12/289,825

(22) Filed: Nov. 5, 2008

(65) Prior Publication Data

US 2009/0125650 A1    May 14, 2009

Related U.S. Application Data

(60) Provisional application No. 60/996,168, filed on Nov. 5, 2007.

(51) Int. Cl.  
*G06F 5/00* (2006.01)
(52) U.S. Cl. ............................................. 710/57; 710/52
(58) Field of Classification Search ................ 710/1, 52, 710/57

See application file for complete search history.

(56) References Cited

U.S. PATENT DOCUMENTS

| | | | |
|---|---|---|---|
| 7,769,926 B2* | 8/2010 | Wu et al. .......................... 710/56 |
| 2006/0146833 A1 | 7/2006 | Roberts et al. | |
| 2009/0080380 A1* | 3/2009 | Chun et al. .................... 370/329 |

FOREIGN PATENT DOCUMENTS

| | | |
|---|---|---|
| EP | 1599063 | 11/2005 |
| WO | WO2007/100547 | 9/2007 |
| WO | WO2007/147431 | 12/2007 |

OTHER PUBLICATIONS

Samsung, "Buffer Status Reporting", 3 GPP TSG-RAN2 Meeting #59bis, R2-074265, Shanghai, China, Oct. 8-12, 2007, pp. 1-3.
Nokia Coporation, Nokia Siemens Networks, "Scheduling Information for E-UTRAN uplink", 3GPP TSG-RAN WG2 Meeting #59bis, R2-073909, Shanghai, China, Oct. 8-12, 2007, pp. 1-3.

* cited by examiner

*Primary Examiner* — Alford W. Kindred  
*Assistant Examiner* — Richard B Franklin  
(74) *Attorney, Agent, or Firm* — Squire, Sanders & Dempsey (US) LLP

(57) ABSTRACT

An apparatus, system and method for increasing buffer status reporting efficiency and adapting buffer status reporting according to uplink capacity. User equipment is configured a monitor a usage of a plurality of buffers, detect one of a plurality of pre-selected conditions corresponding to at least one of the plurality of buffers, designate one of a plurality of buffer status reporting formats depending on the pre-selected condition detected, communicate a buffer status report to a network device in accordance with the buffer status reporting format designated. The buffer status reporting format is configured to minimize buffer status reporting overhead created by the communicating of the buffer status report.

24 Claims, 6 Drawing Sheets

APPARATUS, SYSTEM, AND METHOD FOR DESIGNATING A BUFFER STATUS REPORTING FORMAT BASED ON DETECTED PRE-SELECTED BUFFER CONDITIONS

CROSS-REFERENCE TO RELATED APPLICATIONS

This application claims priority of U.S. Provisional Patent Application No. 60/996,168, filed on Nov. 5, 2007. The subject matter of this earlier application is hereby incorporated by reference.

BACKGROUND OF THE INVENTION

1. Field of the Invention

The present invention is directed, in part, to methods and systems for communicating buffer status reports.

2. Description of the Related Art

Scheduling information to support uplink scheduling operations has been introduced in High-Seed Uplink Packet Access (HSUPA). Scheduling information in HSUPA basically consists of buffer status and power headroom reports. However, communicating buffer status reports under currently available solutions is inefficient and inflexible due to an inability to adjust buffer status report formats in accordance with a need to report uplink availability.

SUMMARY OF THE INVENTION

The present invention has been developed in response to the present state of the art, and in particular, in response to the problems and needs in the art that have not yet been fully solved by currently available communication system technologies. Accordingly, the present invention has been developed to enable a buffer status reporting apparatus, system, and method.

In one embodiment of the present invention, a method comprises monitoring a usage of a plurality of buffers, detecting one of a plurality of pre-selected conditions corresponding to the plurality of buffers, designating one of a plurality of buffer status reporting formats depending on the pre-selected condition detected, and communicating a buffer status report to a network device in accordance with the buffer status reporting format designated. In certain embodiments, the buffer status reporting format minimizes buffer status reporting overhead created by the communicating of the buffer status report. In some embodiments, the plurality of pre-selected conditions comprises a buffer associated with a radio bearer group storing data beyond a pre-selected threshold.

In certain embodiments, the plurality of buffer status reporting formats comprises a long buffer status reporting format and a short buffer status reporting format. The short buffer status reporting format may correspond to reporting a buffer status of a single radio bearer group. Additionally, the long buffer status reporting format corresponds to reporting a buffer status of multiple radio bearer groups.

In some embodiments, the designating unit is configured to only designate the long buffer status reporting format when there is sufficient uplink capacity to communicate using the long buffer status reporting format. In certain embodiments, the designating unit is configured to only designate the long buffer status reporting format when multiple buffers for different radio bearer groups storing data beyond a pre-selected threshold. In some embodiments, the designating unit is configured to designate the short buffer status reporting format when there is insufficient uplink capacity.

In some embodiments, the short buffer status reporting format may comprise 1 byte of information and the long buffer status reporting format comprises 3 bytes of information. However, in other embodiments the short buffer status reporting format may also comprise a 2-bit radio bearer group identifier and a 6-bit buffer size. In certain embodiments, the long buffer status reporting format comprises four segments of 6-bits of information, each segment thereof corresponding to a distinct radio bearer group. In certain embodiments, the method may also include selecting a buffer status of a radio bearer group of a highest priority. The radio bearer group of the highest priority may comprise a radio bearer group having a most amount of data in a radio bearer group buffer.

In another embodiment of the present invention, an apparatus comprises a monitoring unit configured to monitor a usage of a plurality of buffers, a detecting unit configured to detect one of a plurality of pre-selected conditions corresponding to the plurality of buffers, a designating unit configured to designate one of a plurality of buffer status reporting formats depending on the pre-selected condition detected, and a communicating unit configured to communicate a buffer status report to a network device in accordance with the buffer status reporting format designated.

In certain embodiments, the buffer status reporting format is configured to minimize buffer status reporting overhead created by the communicating of the buffer status report. The short buffer status reporting format may correspond to reporting a buffer status of a single radio bearer group. Additionally, the long buffer status reporting format corresponds to reporting a buffer status of multiple radio bearer groups.

In some embodiments, the designating unit is configured to only designate the long buffer status reporting format when there is sufficient uplink capacity to communicate using the long buffer status reporting format. In certain embodiments, the designating unit is configured to only designate the long buffer status reporting format when multiple buffers for different radio bearer groups storing data beyond a pre-selected threshold. In some embodiments, the designating unit is configured to designate the short buffer status reporting format when there is insufficient uplink capacity.

In some embodiments, the short buffer status reporting format may comprise 1 byte of information and the long buffer status reporting format comprises 3 bytes of information. However, in other embodiments the short buffer status reporting format may also comprise a 2-bit radio bearer group identifier and a 6-bit buffer size. In certain embodiments, the long buffer status reporting format comprises four segments of 6-bits of information, each segment thereof corresponding to a distinct radio bearer group. In certain embodiments, the method may also include selecting a buffer status of a radio bearer group of a highest priority. The radio bearer group of the highest priority may comprise a radio bearer group having a most amount of data in a radio bearer group buffer.

In another embodiment of the present invention, an apparatus includes a monitoring means for monitoring a usage of a plurality of buffers, and a detecting means for detecting one of a plurality of pre-selected conditions corresponding to the plurality of buffers. The apparatus also includes a designating means for designating one of a plurality of buffer status reporting formats depending on the pre-selected condition detected, and a communicating means for communicating a buffer status report to a network device in accordance with the buffer status reporting format designated.

In one embodiment of the present invention, a method comprises monitoring a usage of a plurality of buffers, detecting one of a plurality of pre-selected conditions corresponding to the plurality of buffers, designating one of a plurality of buffer status reporting formats depending on the pre-selected condition detected, and communicating a buffer status report to a network device in accordance with the buffer status reporting format designated. In certain embodiments, the buffer status reporting format minimizes buffer status reporting overhead created by the communicating of the buffer status report. In some embodiments, the plurality of pre-selected conditions comprises a buffer associated with a radio bearer group storing data beyond a pre-selected threshold.

In certain embodiments, the plurality of buffer status reporting formats comprises a long buffer status reporting format and a short buffer status reporting format. The short buffer status reporting format may correspond to reporting a buffer status of a single radio bearer group. Additionally, the long buffer status reporting format corresponds to reporting a buffer status of multiple radio bearer groups.

In some embodiments, the designating unit is configured to only designate the long buffer status reporting format when there is sufficient uplink capacity to communicate using the long buffer status reporting format. In certain embodiments, the designating unit is configured to only designate the long buffer status reporting format when multiple buffers for different radio bearer groups storing data beyond a pre-selected threshold. In some embodiments, the designating unit is configured to designate the short buffer status reporting format when there is insufficient uplink capacity.

In some embodiments, the short buffer status reporting format may comprise 1 byte of information and the long buffer status reporting format comprises 3 bytes of information. However, in other embodiments the short buffer status reporting format may also comprise a 2-bit radio bearer group identifier and a 6-bit buffer size. In certain embodiments, the long buffer status reporting format comprises four segments of 6-bits of information, each segment thereof corresponding to a distinct radio bearer group. In certain embodiments, the method may also include selecting a buffer status of a radio bearer group of a highest priority. The radio bearer group of the highest priority may comprise a radio bearer group having a most amount of data in a radio bearer group buffer.

In another embodiment of the present invention, an apparatus comprises a monitoring unit configured to monitor a usage of a plurality of buffers, a detecting unit configured to detect one of a plurality of pre-selected conditions corresponding to the plurality of buffers, a designating unit configured to designate one of a plurality of buffer status reporting formats depending on the pre-selected condition detected, and a communicating unit configured to communicate a buffer status report to a network device in accordance with the buffer status reporting format designated.

In certain embodiments, the buffer status reporting format is configured to minimize buffer status reporting overhead created by the communicating of the buffer status report. The short buffer status reporting format may correspond to reporting a buffer status of a single radio bearer group. Additionally, the long buffer status reporting format corresponds to reporting a buffer status of multiple radio bearer groups.

In some embodiments, the designating unit is configured to only designate the long buffer status reporting format when there is sufficient uplink capacity to communicate using the long buffer status reporting format. In certain embodiments, the designating unit is configured to only designate the long buffer status reporting format when multiple buffers for different radio bearer groups storing data beyond a pre-selected threshold. In some embodiments, the designating unit is configured to designate the short buffer status reporting format when there is insufficient uplink capacity.

In some embodiments, the short buffer status reporting format may comprise 1 byte of information and the long buffer status reporting format comprises 3 bytes of information. However, in other embodiments the short buffer status reporting format may also comprise a 2-bit radio bearer group identifier and a 6-bit buffer size. In certain embodiments, the long buffer status reporting format comprises four segments of 6-bits of information, each segment thereof corresponding to a distinct radio bearer group. In certain embodiments, the method may also include selecting a buffer status of a radio bearer group of a highest priority. The radio bearer group of the highest priority may comprise a radio bearer group having a most amount of data in a radio bearer group buffer.

In another embodiment of the present invention, an apparatus includes a monitoring means for monitoring a usage of a plurality of buffers, and a detecting means for detecting one of a plurality of pre-selected conditions corresponding to the plurality of buffers. The apparatus also includes a designating means for designating one of a plurality of buffer status reporting formats depending on the pre-selected condition detected, and a communicating means for communicating a buffer status report to a network device in accordance with the buffer status reporting format designated.

In yet another embodiment of the present invention, a computer-readable medium is encoded with a computer program configured to control a processor to perform operations that include monitoring a usage of a plurality of buffers, and detecting one of a plurality of pre-selected conditions corresponding to the plurality of buffers. The operations also include designating one of a plurality of buffer status reporting formats depending on the pre-selected condition detected, and communicating a buffer status report to a network device in accordance with the buffer status reporting format designated.

In yet another embodiment of the present invention, a computer-readable medium is encoded with a computer program configured to control a processor to perform operations that include monitoring a usage of a plurality of buffers, and detecting one of a plurality of pre-selected conditions corresponding to the plurality of buffers. The operations also include designating one of a plurality of buffer status reporting formats depending on the pre-selected condition detected, and communicating a buffer status report to a network device in accordance with the buffer status reporting format designated.

BRIEF DESCRIPTION OF THE DRAWINGS

To ensure that the invention will be readily understood, a more particular description of the invention briefly described above will be rendered by reference to specific embodiments illustrated in the appended drawings. Understanding that these drawings depict only typical embodiments of the invention and are not to be considered to be limiting of its scope, the invention will be described and explained with additional specificity and detail through the use of the accompanying drawings, in which.

DETAILED DESCRIPTION OF THE PREFERRED EMBODIMENT(S)

It shall be readily understood that the components of the present invention, as generally described and illustrated in the Figures herein, may be arranged and designed in a wide variety of different configurations. Thus, the following more detailed description of the embodiments of the apparatus, system, and method of the present invention, as represented in the attached Figures, is not intended to limit the scope of the invention, as claimed, but is merely representative of selected embodiments of the invention Indeed, the features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

Figure 1:
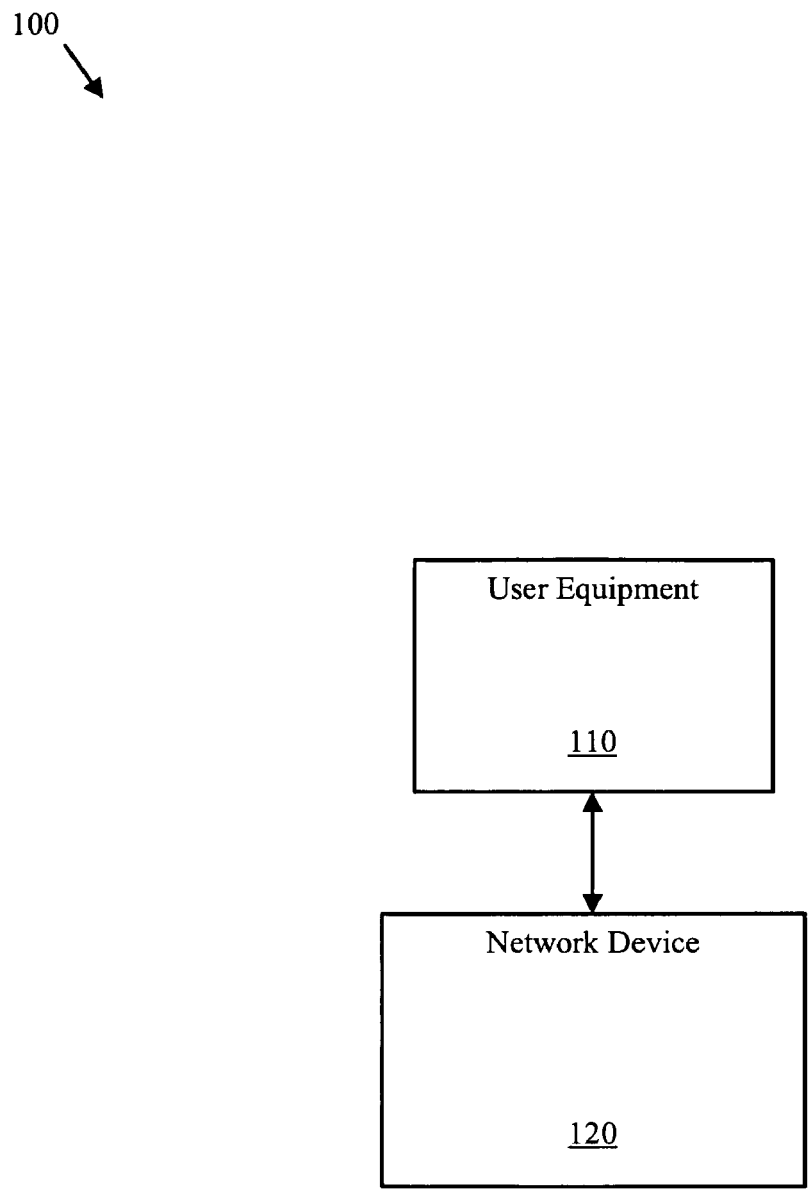
FIG. 1 is a block diagram of a system in accordance with one embodiment of the present invention.

FIG. 1 is a block diagram of a system 100 in accordance with one embodiment of the present invention. The depicted system 100 includes user equipment (UE) 110 and a network device 120. The components of the system 100 cooperate to maximize buffer status reporting efficiency in accordance with an uplink capacity.

In certain embodiments, the network device 120 is configured to receive buffer status reports from the user equipment 110. In some embodiments, the user equipment is configured to monitor a usage of a plurality of buffers and detect one of a plurality of pre-selected conditions corresponding to at least one of the plurality of buffers. In certain embodiments, the user equipment is also configured to designate one of a plurality of buffer status reporting formats depending on the pre-selected condition detected and communicate a buffer status report to a network device in accordance with the buffer status reporting format designated.

Depending upon the embodiment, the buffer status reporting format designated minimizes buffer status reporting overhead created by the communicating of the buffer status report. Accordingly, the system 100 operates to minimize buffer status reporting overhead. As will be discussed in additional detail below, in some embodiments, the system 100 may operate to minimize buffer status reporting overhead in accordance with an uplink capacity of the user equipment.

Figure 2:
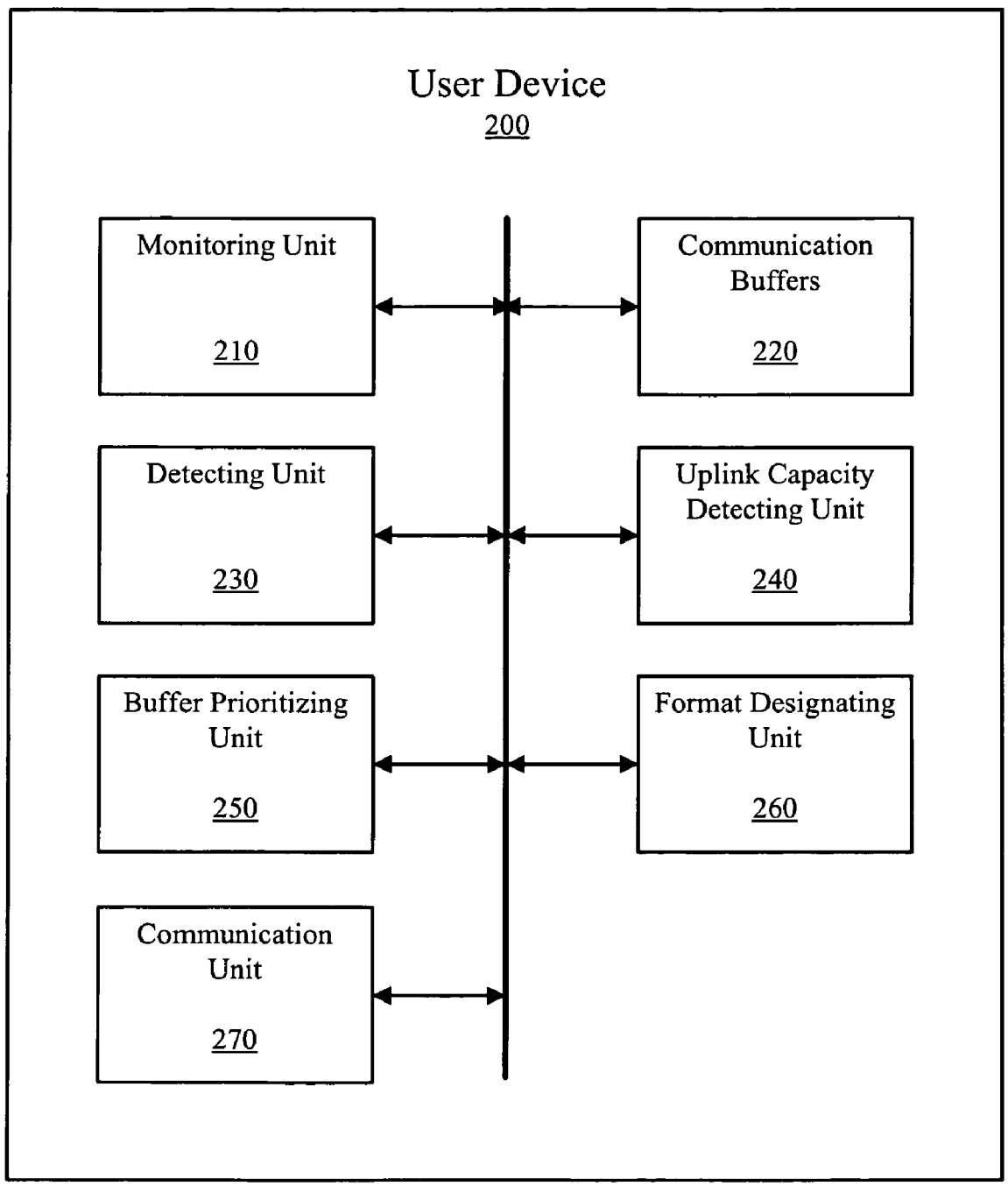
FIG. 2 is a block diagram of user equipment in accordance with one embodiment of the present invention.

FIG. 2 is a block diagram of user equipment 200 in accordance with one embodiment of the present invention. The depicted user equipment 200 includes a monitoring unit 210, a plurality of communication buffers 220, a detecting unit 230, an uplink capacity detecting unit 240, a buffer prioritizing unit 250, a format designating unit 260, and a communicating unit 270. The units of the user equipment 200 cooperate to maximize buffer status reporting efficiency in accordance with an uplink capacity.

In some embodiments, the monitoring unit 210 is configured to monitor a usage of the plurality of buffers 220. In certain embodiments, the monitoring unit 210 and the detecting unit 230 cooperate to enable the detecting unit 230 to detect one of a plurality of pre-selected conditions corresponding to the plurality of buffers. The pre-selected conditions will be discussed in further detail below but may include, for example, any data in one or more buffers, data in one or more buffers beyond a pre-selected threshold.

In certain embodiments, the designating unit 260 is configured to designate one of a plurality of buffer status reporting formats depending on the pre-selected condition detected. In certain embodiments, the plurality of buffer status reporting formats may include a short format and a long format. As will be discussed in further detail below, in some embodiments, the short buffer status reporting format corresponds to reporting a buffer status of a single radio bearer group and the long buffer status reporting format corresponds to reporting a buffer status of multiple radio bearer groups.

In certain embodiments, the uplink capacity detecting unit 240 detects the uplink capacity of the user equipment 200. In such embodiments, the uplink capacity detecting unit 240 may cooperate with the designating unit 260 to ascertain the appropriate buffer status reporting format. In certain embodiments, the format proposed by the designating unit 260 will exceed the uplink capacity detected by the uplink capacity detecting unit 240.

In such embodiments, the buffer prioritizing unit 250 may collaborate with the uplink capacity detecting unit 240 and the designating unit 260 to enable the designating unit 260 to assign/designate the most beneficial buffer status reporting format to the buffer of the highest priority, all in accordance with the uplink capacity of the user equipment 200. This cooperation is further detailed in FIG. 4. In certain embodiments, the communicating unit 270 is configured to communicate a buffer status report to a network device in accordance with the buffer status reporting format designated. In this manner, the user equipment may maximize buffer status reporting efficiency in accordance with an uplink capacity of the user equipment.

In certain embodiments, for buffer status reporting (BSR), radio bearers may be classified into 4 radio bearer groups (RBGs). The mapping of radio bearers on RBG could be either fixed in standards or dynamically configured by RRC. In both cases, an RBG may only include one radio bearer or all of them.

Figure 5:
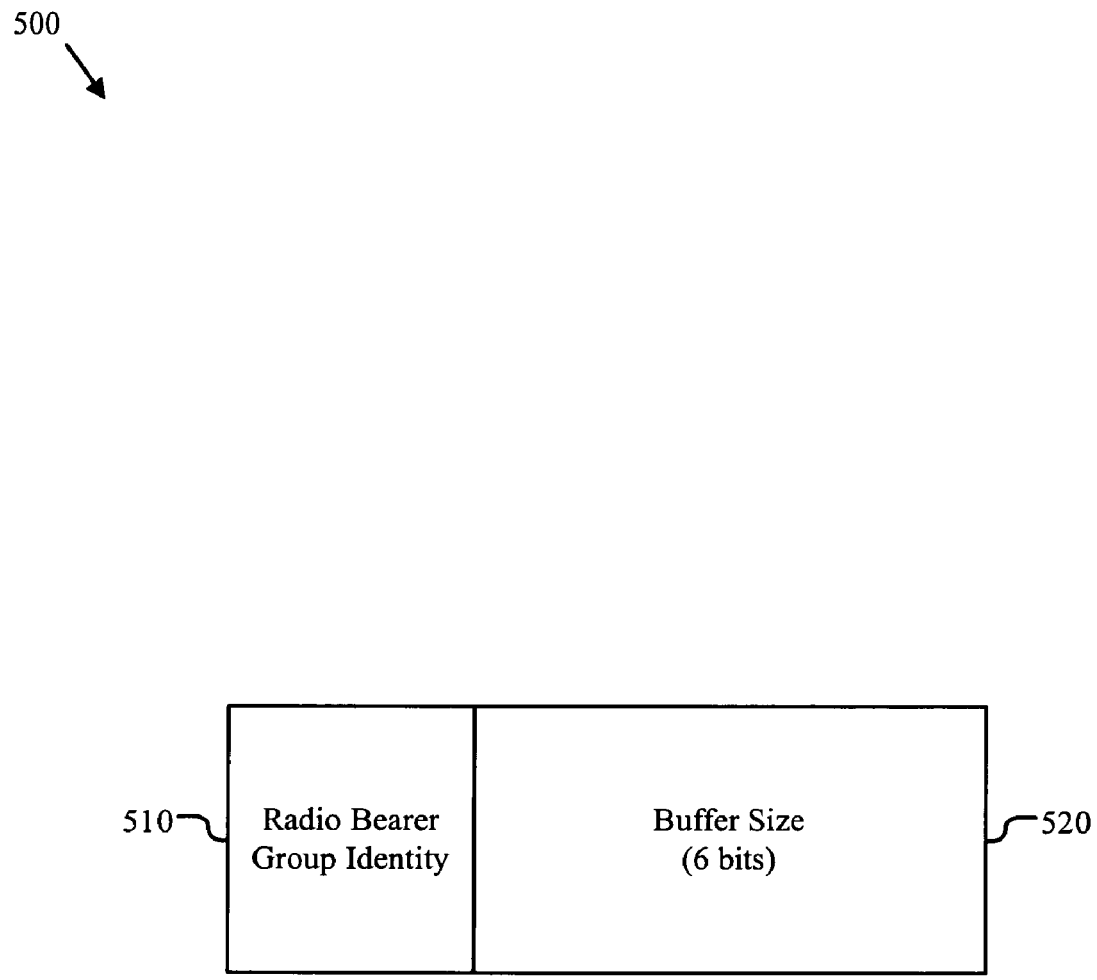
FIG. 5 is a block diagram representing a short buffer status reporting format in accordance with one embodiment of the present invention.
Figure 6:
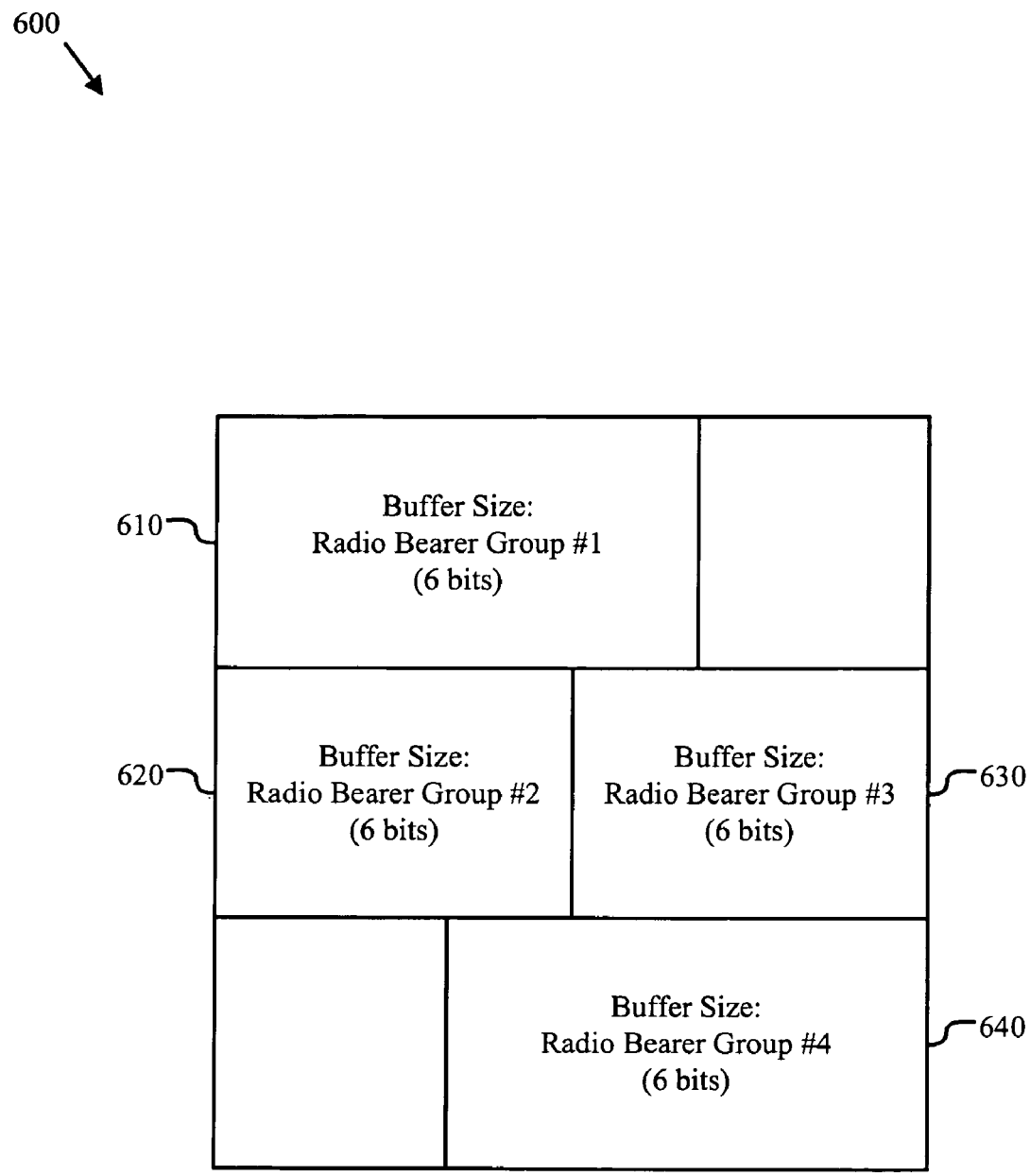
FIG. 6 is a block diagram representing a long buffer status reporting format in accordance with one embodiment of the present invention.

Since it may not be necessary to report the 4 RBGs always (e.g. when only a limited number of bearers are configured), multiple formats of buffer status reporting may be beneficial. In a first format, two bits may be required for RBG identification while in the later case, the 4 buffer size fields may be concatenated as depicted by FIGS. 5 and 6.

In certain embodiments, buffer status reporting directly relates to power headroom reports, HSUPA protocol (High-Speed Uplink Packet Access), eNB (enhanced Node B), and E-TRAN (Universal Mobile Telecommunications Service (UMTS) Terrestrial Radio Access Network). In other words, power headroom reports have been first introduced for HSUPA. Radio optimum resource management requires an eNB to know whether or not user equipment is operating close to a maximum transmission power. Moreover, due to adaptive transmission bandwidth (i.e., the user transmission bandwidth can be modified on a TTI basis), in E-UTRAN uplink it is even more important to know the power spectral density used at the use equipment to avoid that, for example, the eNB allocates a transmission bandwidth that cannot be supported given the maximum user equipment power capabilities.

Assuming a power control dynamic range of 40-60 dB and a resolution of one dB (finer resolution might not be beneficial when considering the actual accuracy of transmission power measurements done at the UE), six bits for the transmission of a power headroom report in uplink would seem sufficient. Although the total number of bits may be decided by RAN1 and RAN4, one might assume in RAN2 that 1 byte is enough for power headroom reporting. Indeed, in some embodiments, power headroom reports are 1 byte long.

Many of the functional units described in this specification have been labeled as units, in order to more particularly emphasize their implementation independence. For example, a unit may be implemented as a hardware circuit comprising custom VLSI circuits or gate arrays, off-the-shelf semiconductors such as logic chips, transistors, or other discrete components. A unit may also be implemented in programmable hardware devices such as field programmable gate arrays, programmable array logic, programmable logic devices or the like.

Units may also be implemented in software for execution by various types of processors. An identified unit of executable code may, for instance, comprise one or more physical or logical blocks of computer instructions which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit.

Indeed, a unit of executable code may be a single instruction, or many instructions, and may even be distributed over several different code segments, among different programs, among different processors, and across several memory devices. Similarly, operational data may be identified and illustrated herein within units, and may be embodied in any suitable form and organized within any suitable type of data structure. The operational data may be collected as a single data set, or may be distributed over different locations including over different storage devices, and may exist, at least partially, merely as electronic signals on a system or network.

In addition, while the terms, data, packet, and/or datagram have been used in the description of the present invention, the invention has import to many types of network data. For purposes of this invention, the term data includes packet, cell, frame, datagram, bridge protocol data unit packet, packet data and any equivalents thereof.

Figure 3:
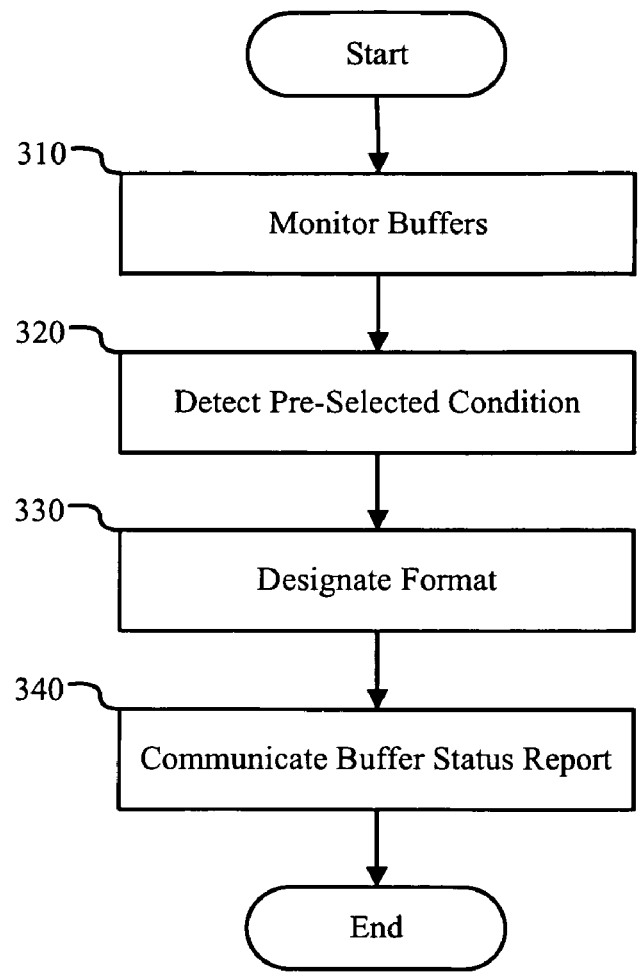
FIG. 3 is a flow chart diagram of a method in accordance with one embodiment of the present invention.

FIG. 3 is a flow chart diagram of a method 300 in accordance with one embodiment of the present invention. The depicted method 300 includes monitoring 310 buffers, detecting 320 a pre-selected condition, designating 330 a format, and communicating 340 a buffer status report. The operations of the method 300 provide a solution for collaborating to maximize buffer status reporting efficiency in accordance with an uplink capacity.

In certain embodiments, monitoring 310 buffers may include monitoring a usage of one or more communication buffers. In some embodiments, detecting 320 a pre-selected condition may include detecting that one or more communication buffers include data or that the data in communication buffers has exceeded a pre-determine threshold. In certain embodiments, designating 330 a format may include designating a buffer status reporting format complementary to the pre-selected condition detected by operation 320. The operation of detecting 320 and determining 330 are described in further detail in FIGS. 4 and 5. In some embodiments, communicating 340 may include communicating a buffer status report corresponding to one or more buffers in accordance with the buffer status report format designated by the designate operation 330.

Figure 4:
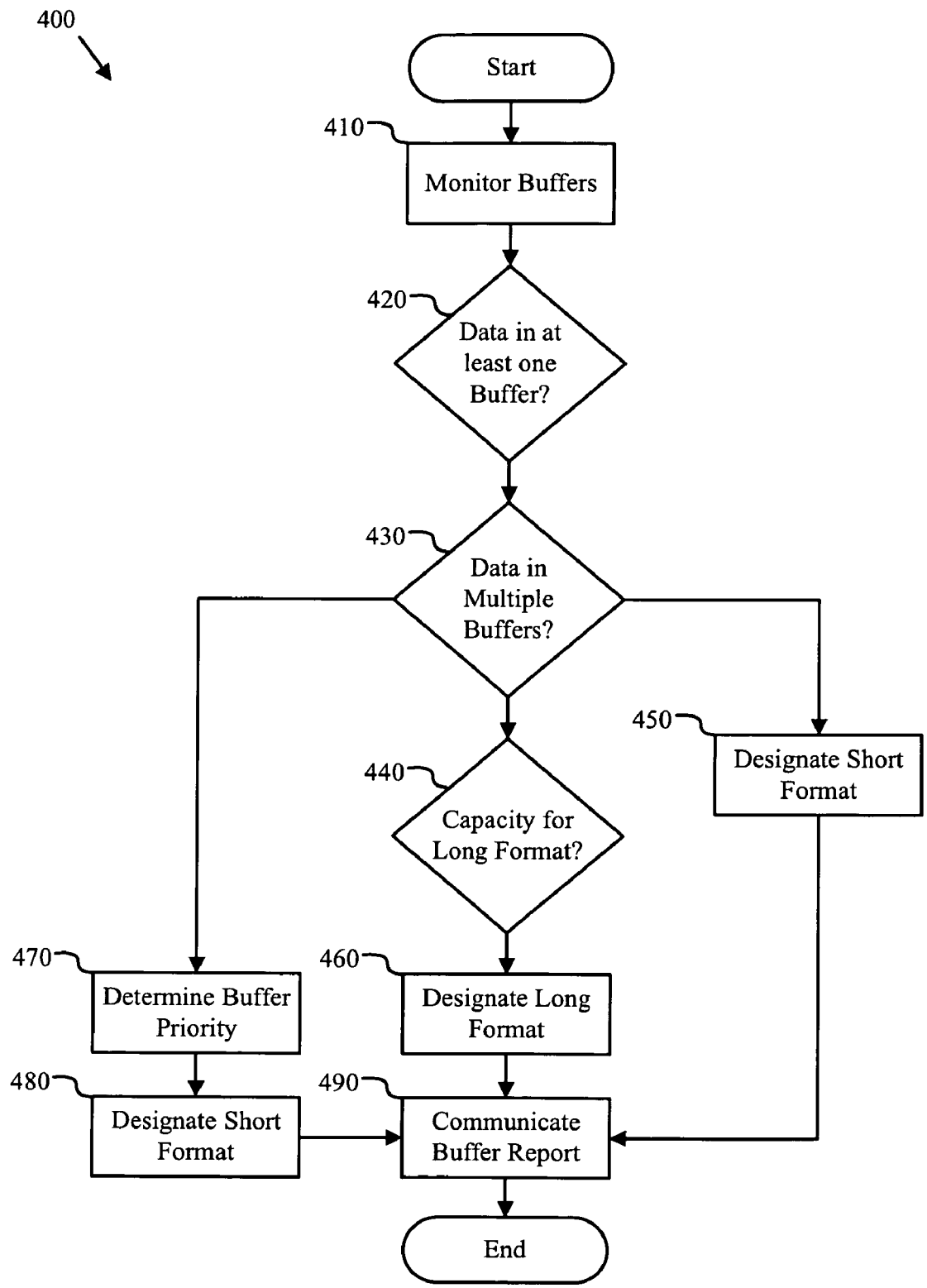
FIG. 4 is a flow chart diagram of a method in accordance with one embodiment of the present invention.

FIG. 4 is a flow chart diagram of a method 400 in accordance with one embodiment of the present invention. The method 400 includes the operations of monitoring 410 buffers, determining 420 whether at least one of the buffers has data, determining 430 whether multiple buffers have data, determining 440 whether the uplink capacity, designating 450 a short format, designating 460 a long format, determining 470 buffer priority, designating a short format 480, and communicating a buffer status report 490. The operations of the method 400 maximize buffer status reporting efficiency in accordance with an uplink capacity.

In certain embodiments, the method 400 begins by monitoring 410 whether at least one buffer of multiple buffers has data. If there is no data, the method 400 continues to monitor 410 the buffers. However, if there is at least one buffer with data, then the method continues by determining 430 whether multiple buffers have data. If only one buffer has data, the method 400 continues by designating 450 a short buffer status reporting format for communication 490 proposes.

However, if multiple communication buffers have data, then the method 400 continues by determining 440 whether there is sufficient uplink capacity to communicate a buffer status report using the long buffer status report format for communication 490 purposes. If there is sufficient uplink capacity, then the method 400 continues by designating the long buffer status report format. However, if there is not enough uplink capacity to use the long format, then the method 400 continues by determining 470 the buffers with data. After the buffer priority has been determined, the method 400 continues by designating a short buffer status reporting format for communicating 490 the buffer with the highest priority. In this manner, the method 400 maximizes buffer status reporting efficiency in accordance with an uplink capacity.

FIG. 5 is a block diagram representing a short buffer status reporting format 500 in accordance with one embodiment of the present invention. The depicted short buffer status reporting format 500 includes a radio bearer group identity 510, and a buffer size 520. The radio bearer group identity 510 enables a network device, such as a base station, to know the buffer status, i.e., to determine the data in a buffer corresponding to a radio bearer group. In certain embodiments, the short buffer status reporting format 500 is designated for reporting a buffer status report because the short buffer status reporting format 500 is the most efficient format.

FIG. 6 is a block diagram representing a long buffer status reporting format 600 in accordance with one embodiment of the present invention. The a long buffer status reporting format 600 includes a buffer size of radio bearer group 1 (610), a buffer size of radio bearer group 2 (620), a buffer size of radio bearer group 3 (630), and a buffer size of radio bearer group 4 (640). The long buffer status reporting format 600 is allocated in four groups of six bits. In certain embodiments, similar to the short buffer status reporting format 500 of FIG. 5, the long buffer status reporting format 600 is designated for reporting a buffer status report of multiple radio bearer groups because the long buffer status reporting format 600 is the most efficient format. Accordingly, the present invention promotes efficiency by providing a solution for adjusting the format of a buffer status report depending upon need.

Regarding buffer status reports, compared to HSUPA, E-UTRAN uplink is based on an orthogonal multiple access scheme (SC-FDMA). Since under these circumstances the allocation of radio resources to a user that does not have data to transmit directly results in a capacity loss, the design of buffer status reporting scheme is relatively important in E-UTRAN uplink.

Buffer status reports in E-UTRAN may allow differentiation between radio bearers with different quality of service (QoS) requirements. To allow for QoS differentiation at the eNB, in certain embodiments, a priority-based buffer status report is provided, where a priority buffer status report may be a "reduced" buffer status report which contains buffer status information for different priority classes. A priority class is defined by grouping radio bearers with similar QoS requirement (but one priority class might also consist of only one radio bearer). The number of radio bearer group to report should not be too small to provide enough information to the scheduler but cannot be too large either to limit the overhead. With a size of 5 bits for LCID, a total of four radio bearer groups may be a good compromise. Accordingly, a radio bearers may be classified into 4 radio bearer groups (RBGs).

A total of 4 RBGs may include two bits for identification of the group. In some embodiments, the total size of the buffer status report (BSR) is byte-aligned. In such embodiments, the candidate sizes for the buffer size may be six bit and 14 bit. However, a 14 bit buffer size table gives a 16384 code points and 0.07% step size, which may be too much. A six bit buffer size gives 64 code points and 12.77% step size that are comparable to 32 code points and 23.9% step size of HSUPA. So, a six bit buffer size field may be beneficial.

Depending upon the embodiment, a buffer size may be an amount of buffered data before filling the transport block or amount of data buffered after filling the transport block. In some embodiments, the buffer status report (BSR) aims at helping a scheduler to allocate future resources. As such, it may be logical to consider the amount of data buffered after filling a transport block. Accordingly, in some embodiments, buffer status reports include the amount of data left in the buffer after filling the transport block.

In some embodiments, data is buffered in the user equipment across radio link control (RLC) and Packet Data Convergence Protocol (PDCP). RLC may await ciphered and compressed PDCP protocol data units (PDUs) for transmission and retransmission(s) while in PDCP it is unciphered and uncompressed PDCP service data units (SDUs) that are buffered. Whether a PDCP SDU can be processed and given to RLC for transmission is may be a matter of UE implementation. For the very same service, different UEs might therefore report different BSR depending on whether RLC or PDCP is considered. In order to reduce possible inconsistencies in reporting, reporting the total amount of buffered data without making any distinction between RLC and PDCP may be performed. In certain embodiments, special considerations might be made for Voice over Internet Protocol (VoIP). In some embodiments, buffer status reports include the total amount of buffered data per ratio bearer group regardless of whether it is RLC or PDCP.

It may not be necessary to report the 4 RBGs always (e.g., when only a limited number of bearers are configured), it may be beneficial to introduce two formats of BSR: one where only one RBG is reported and one where all four RBGs are. In the first case, 2 bits may be beneficial for RBG identification while in the later case, the 4 buffer size fields can be concatenated as depicted in FIG. 6.

In certain embodiments, Media Access Control (MAC) control elements may carry a buffer status report and a power headroom report. In certain embodiments, this may include one Language Code Identifier (LCID) used for power headroom reports, one LCID used for a short buffer status report, and one LCID used for long buffer status reports. In some embodiments, if power headroom appears to be conveyed with long or short buffer status reports most of the time, additional LCID can be reserved for the concatenation of the two information so as to reduce the signaling overhead.

In some embodiments, a detected condition may include a trigger that depends on the amount of data buffered in the different radio bearer groups (RBG). Examples of a trigger could include a scenario where only one RBG has buffered data wherein a report will be made using a short format. Another example of a trigger could include a scenario where more than one RBG has buffered data wherein a report will be made in a long BSR format. In some embodiments, when the enhanced Node-B (eNB) receives a short BSR format, the eNB knows that RBGs other than the one reported do not have any data buffered.

In some embodiments, a variant could introduce a threshold that could be configured on a RBG basis. Accordingly, in some embodiments, if only one RBG has an amount of buffered data that exceeds a threshold then a report using a short BSR format is communicated. In some embodiments, as soon as more than one RBG has an amount of buffered data that exceeds its threshold a report in a long BSR format is communicated. As such, when the eNB receives a short BSR format, it knows that RBGs other than the one reported do not have an amount of buffered data which exceed their respective threshold.

Additionally, in some embodiments, the size of an uplink (UL) grant could also be taken into account (i.e., the size of the uplink transport block). For example, as soon as more than one RBG has buffered data and there is enough room in the UL grant then a report using a long format may be communicated. If there is not enough UL grant then a short format with the RBG of highest priority or with the RBG with the largest amount of buffered data may be communicated. In other embodiments, as soon as more than one RBG has an amount of buffered data exceeds a threshold and there is enough room in the UL to grant a long format communication, then long BSR format is used, otherwise with the RBG of highest priority or with the RBG with the largest amount of buffered data may be communicated using a short format. Accordingly, the present invention minimizes the overhead associated to BSRs and adapts to available UL bandwidth.

Reference to a computer-readable medium may take any form capable of generating a signal, causing a signal to be generated, or causing execution of a program of machine-readable instructions on a digital processing apparatus. A computer readable medium may be embodied by a transmission line, a compact disk, digital-video disk, a magnetic tape, a Bernoulli drive, a magnetic disk, holographic disk or tape, a punch card, flash memory, magnetoresistive memory, integrated circuits, or other digital processing apparatus memory device.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. A method, comprising:
   monitoring a usage of a plurality of buffers;
   detecting one of a plurality of pre-selected conditions corresponding to the plurality of buffers;
   designating one of a plurality of buffer status reporting formats comprising a long buffer status reporting format and a short buffer status reporting format depending on the pre-selected condition detected; and
   communicating a buffer status report to a network device in accordance with the buffer status reporting format designated, wherein the designating designates the long buffer status reporting format when there is sufficient uplink bandwidth to communicate using the long buffer status reporting format.

2. The method of claim 1, wherein the buffer status reporting format minimizes buffer status reporting overhead created by the communicating of the buffer status report.

3. The method of claim 1, wherein the plurality of pre-selected conditions comprises a buffer associated with a radio bearer group storing data beyond a pre-selected threshold.

4. The method of claim 1, wherein the short buffer status reporting format corresponds to reporting a buffer status of a single radio bearer group and the long buffer status reporting format corresponds to reporting a buffer status of multiple radio bearer groups.

5. The method of claim 1, wherein the designating designates the long buffer status reporting format when multiple buffers for different radio bearer groups store data beyond a pre-selected threshold.

6. The method of claim 1, wherein the designating designates the short buffer status reporting format when there is insufficient uplink bandwidth.

7. The method of claim 1, wherein the short buffer status reporting format comprises 1 byte of information and the long buffer status reporting format comprises 3 bytes of information.

8. The method of claim 1, wherein the short buffer status reporting format comprises a 2-bit radio bearer group identifier and a 6-bit buffer size.

9. The method of claim 1, wherein the long buffer status reporting format comprises four segments of 6-bits of information, each segment thereof corresponding to a distinct radio bearer group.

10. The method of claim 1, further comprising:
    selecting a buffer status of a radio bearer group of a highest priority.

11. The method of claim 10, wherein the radio bearer group of the highest priority comprises a radio bearer group having a most amount of data in a radio bearer group buffer.

12. An apparatus, comprising:
    a processor; and
    a memory including computer program code, the memory and the computer program code configured to, with the processor, cause the apparatus at least to monitor a usage of a plurality of buffers;
    detect one of a plurality of pre-selected conditions corresponding to the plurality of buffers;
    designate one of a plurality of buffer status reporting formats comprising a long buffer status reporting format and a short buffer status reporting format depending on the pre-selected condition detected; and
    communicate a buffer status report to a network device in accordance with the buffer status reporting format designated, wherein the designating unit is configured to designate the long buffer status reporting format when there is sufficient uplink bandwidth to communicate using the long buffer status reporting format.

13. The apparatus of claim 12, wherein the buffer status reporting format is configured to minimize buffer status reporting overhead created by the communicating of the buffer status report.

14. The apparatus of claim 12, wherein the plurality of pre-selected conditions comprises a buffer associated with a radio bearer group storing data beyond a pre-selected threshold.

15. The apparatus of claim 12, wherein the short buffer status reporting format corresponds to reporting a buffer status of a single radio bearer group and the long buffer status reporting format corresponds to reporting a buffer status of multiple radio bearer groups.

16. The apparatus of claim 12, wherein the memory and the computer program code are further configured to, with the processor, cause the apparatus at least to designate the long buffer status reporting format when multiple buffers for different radio bearer groups store data beyond a pre-selected threshold.

17. The apparatus of claim 12, wherein the memory and the computer program code are further configured to, with the processor, cause the apparatus at least to designate the short buffer status reporting format when there is insufficient uplink bandwidth.

18. The apparatus of claim 12, wherein the short buffer status reporting format comprises 1 byte of information and the long buffer status reporting format comprises 3 bytes of information.

19. The apparatus of claim 12, wherein the short buffer status reporting format comprises a 2-bit radio bearer group identifier (ID) and a 6-bit buffer size.

20. The apparatus of claim 12, wherein the long buffer status reporting format comprises four segments of 6-bits of information, each segment thereof corresponding to a distinct radio bearer group.

21. The apparatus of claim 12, wherein the memory and the computer program code are further configured to, with the processor, cause the apparatus at least to select a buffer status of a radio bearer group of a highest priority.

22. The apparatus of claim 21, wherein the radio bearer group of the highest priority comprises a radio bearer group having a most amount of data in a radio bearer group buffer.

23. An apparatus, comprising:
    monitoring means for monitoring a usage of a plurality of buffers;
    detecting means for detecting one of a plurality of pre-selected conditions corresponding to the plurality of buffers;
    designating means for designating one of a plurality of buffer status reporting formats comprising a long buffer status reporting format and a short buffer status reporting format depending on the pre-selected condition detected; and
    communicating means for communicating a buffer status report to a network device in accordance with the buffer status reporting format designated, wherein the designating means designates the long buffer status reporting format when there is sufficient uplink bandwidth to communicate using the long buffer status reporting format.

24. A non-transitory computer-readable medium encoded with a computer program configured to control a processor to perform operations comprising:

monitoring a usage of a plurality of buffers;

detecting one of a plurality of pre-selected conditions corresponding to the plurality of buffers;

designating one of a plurality of buffer status reporting formats comprising a long buffer status reporting format and a short buffer status reporting format depending on the pre-selected condition detected; and communicating a buffer status report to a network device in accordance with the buffer status reporting format designated, wherein the designating designates the long buffer status reporting format when there is sufficient uplink bandwidth to communicate using the long buffer status reporting format.

* * * * *